United States Patent
Ng et al.

(10) Patent No.: US 7,405,655 B2
(45) Date of Patent: Jul. 29, 2008

(54) SECURITY FOR A CARGO CONTAINER

(75) Inventors: Joseph S. Ng, Montebello, CA (US); George W. Wells, Friendswood, TX (US)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 11/361,201

(22) Filed: Feb. 24, 2006

(65) Prior Publication Data

US 2006/0261944 A1 Nov. 23, 2006

Related U.S. Application Data

(63) Continuation of application No. 10/791,957, filed on Mar. 2, 2004, now abandoned.

(51) Int. Cl.
*G08B 13/14* (2006.01)

(52) U.S. Cl. ............ 340/568.1; 340/539.1; 340/539.13; 340/539.26; 340/540; 340/541; 340/825.49; 340/825.72

(58) Field of Classification Search ............... 340/568.1, 340/539.1, 539.13, 539.23, 539.26, 540, 340/541, 825.49, 825.69, 825.72; 235/383, 235/385; 700/213, 217
See application file for complete search history.

(56) References Cited

U.S. PATENT DOCUMENTS

| 5,712,789 | A | * | 1/1998 | Radican ...................... 700/226 |
|---|---|---|---|---|
| 5,825,283 | A | | 10/1998 | Camhi |
| 5,917,433 | A | | 6/1999 | Keillor et al. |
| 6,628,941 | B2 | | 9/2003 | Knoblach et al. |
| 6,657,549 | B1 | | 12/2003 | Avery |
| 6,972,682 | B2 | * | 12/2005 | Lareau et al. ............ 340/568.1 |
| 2002/0120394 | A1 | | 8/2002 | Rayne |
| 2003/0105971 | A1 | | 6/2003 | Angelo et al. |
| 2004/0196152 | A1 | | 10/2004 | Tice |

* cited by examiner

*Primary Examiner*—Hung T. Nguyen
(74) *Attorney, Agent, or Firm*—Mark M. Takahashi

(57) ABSTRACT

Methods and apparatus are provided for securing and/or tracking cargo containers. The security unit comprises a positioning receiver configured to provide a position of the cargo container and a memory configured to store a first geocentric zone and a second geocentric zone of the cargo container. The security unit also comprises a controller coupled to the positioning receiver and the memory. The security unit is configured to receive the position of the cargo container from the positioning receiver, determine if the position of the cargo container is within one of the first geocentric zone and the second geocentric zone stored in the memory, operate in a first operating mode associated with the first geocentric zone if the position is within the first geocentric zone, and operate in a second operating mode associated with the second geocentric zone if the position is within the second geocentric zone.

38 Claims, 8 Drawing Sheets

SECURITY FOR A CARGO CONTAINER

This is a continuation application of U.S. application Ser. No. 10/791,957, filed Mar. 2, 2004 now adandoned.

TECHNICAL FIELD

The present invention generally relates to transportation security, and more particularly relates to a security unit and methods for a cargo container.

BACKGROUND

Securing the transportation infrastructure has continued to be a focus of the private and public sectors. Contraband, such as illegal drugs and weapons, is continually smuggled across geopolitical boundaries and such illegal activities have an undesirable impact on society, including decreasing national security. In addition, theft of goods from private or public entities during transit also has an undesirable impact on societies or organizations, including significant economic impacts. Accordingly, reducing such illegal activities has vast benefits and highly desirable.

One component of the transportation infrastructure, which is generally susceptible to a myriad of threats, is the cargo container. There are numerous configurations of cargo containers that are available. For example, crates, boxes, or the like, having any shape and dimensions are available for transportation of goods. Furthermore, cargo compartments of a land, water, space, or air vehicles are also available for transportation of goods (e.g., automobile, truck, van, train, rail car, aircraft, ship, barge, trailer, rocket, or the like) and also available for transportation of passengers and/or goods.

Cargo containers are often unattended for significant periods and the vast number of such containers limits the number of containers that can be inspected at various points during transport. Therefore, there are significant periods in which theft or cargo tampering can occur. Moreover, a significant number of containers are not inspected at any time during transit or upon entering a port or border crossing so that entities have less than desirable control of their borders or facilities.

Accordingly, it is desirable to provide a security unit for a cargo container. In addition, it is desirable to provide a security method for a cargo container. Furthermore, other desirable features and characteristics of the present invention will become apparent from the subsequent detailed description and the appended claims, taken in conjunction with the accompanying drawings and the foregoing technical field and background.

BRIEF SUMMARY

A security unit for a cargo container is provided in accordance with an exemplary embodiment of the present invention. The security unit comprises a positioning receiver configured to provide a position of the cargo container and a memory configured to store at least a first geocentric zone and a second geocentric zone. The security unit also comprises a controller coupled to the positioning receiver and the memory. The controller is configured to receive the position of the cargo container from the positioning receiver, determine if the position of the cargo container is within one of the first geocentric zone and the second geocentric zone stored in the memory, operate in a first operating mode associated with the first geocentric zone if the position is within the first geocentric zone, and operate in a second operating mode associated with the second geocentric zone if the position is within the second geocentric zone.

A security method for a cargo container is also provided in accordance with an exemplary embodiment of the present invention. The security method comprises the steps of receiving a position of the cargo container, determining if the position of the cargo container is within one of multiple geocentric zones. The security method further comprises operating in an operating mode associated with a geocentric zone if the position is within the geocentric.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
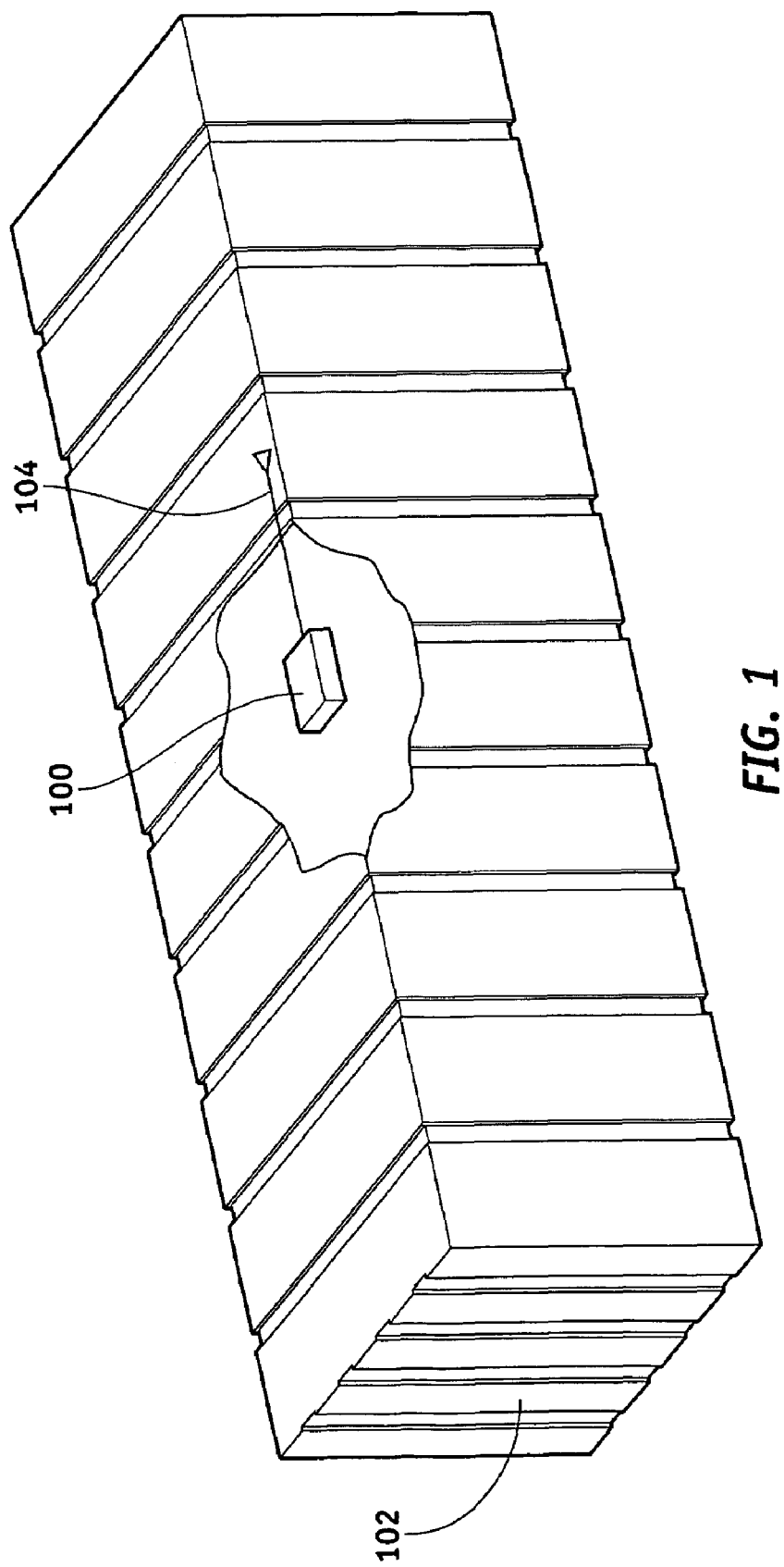
FIG. 1 a cargo container having a security unit in accordance with an exemplary embodiment of the present invention.

Referring to FIG. 1, a security unit 100 for a cargo container 102 is illustrated in accordance with an exemplary embodiment of the present invention. Preferably, the majority of the security unit 100 is located within an interior of the cargo container 102 and more preferably substantially all or the entire security unit 100 is located within the interior of the cargo container 102. However, less than a majority of the security unit 100 and less than substantially all or less than the entire security unit 100 can be located within the interior of the cargo container 102. For example, the entire security unit 100 can be located within the interior of the cargo unit except an antenna 104.

In this illustrative embodiment shown in FIG. 1, the cargo container 102 is a standardized cargo or shipping container. However, the security unit 100 can be configured to provide security for any number of cargo containers other than a standardized cargo container. For example, the security unit 100 can be configured for security of any number of standardized or specialized enclosures, crates, boxes, or the like, having any shape and dimensions. Alternatively, the security unit 100 can provide security for passenger and/or cargo compartment of a land, water, space, or air vehicle (e.g., automobile, truck, van, train, rail car, aircraft, ship, barge, trailer, rocket, or the like), whether or not such vehicle has an integrated propulsion system.

Figure 2:
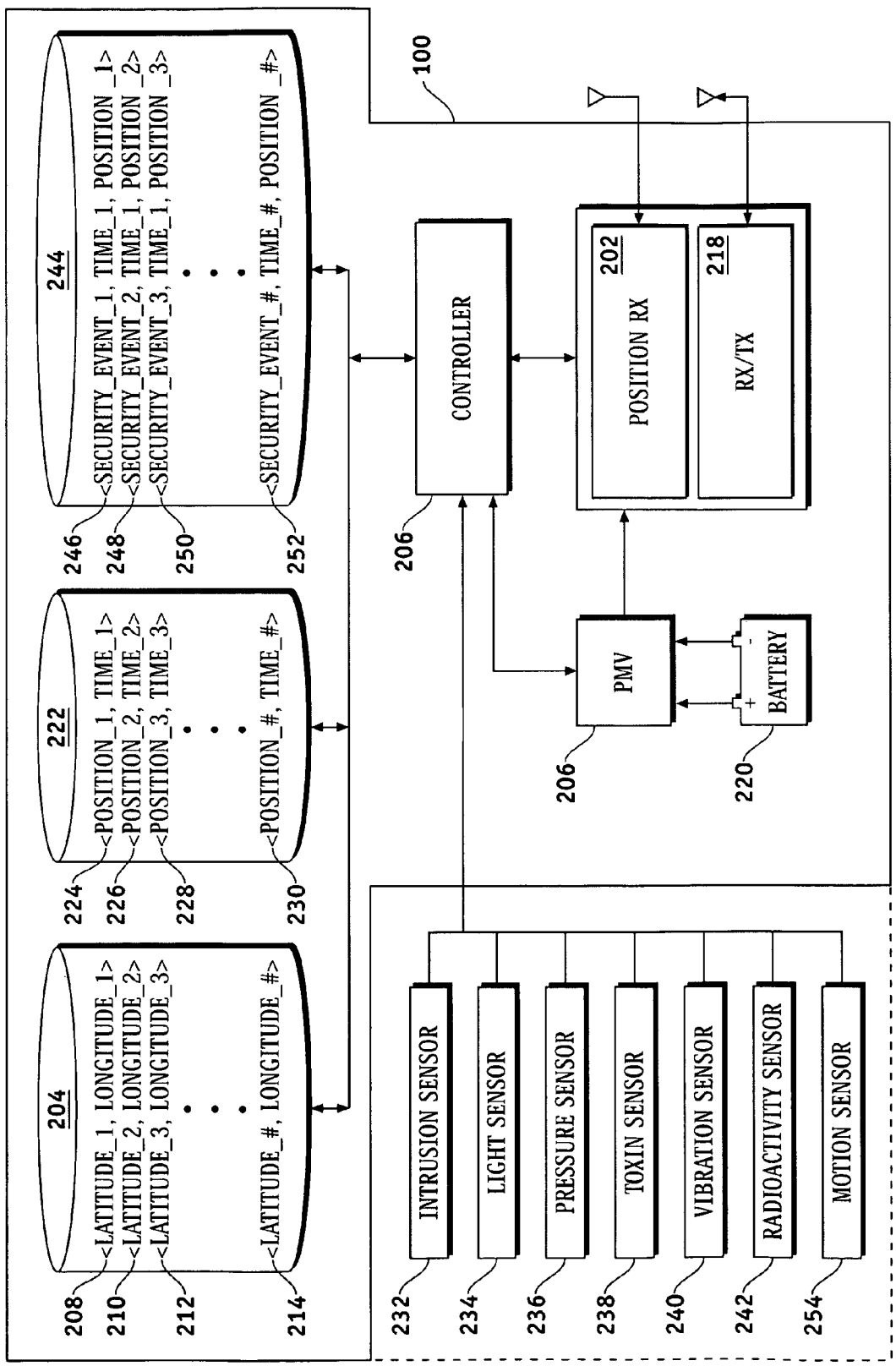
FIG. 2 is the security unit of FIG. 1 in greater detail.

Referring to FIG. 2, the security unit 100 of FIG. 1 is shown in greater detail. Generally, the security unit 100 includes a position receiver 202, a memory 204, and a controller 206. However, the security unit 100 is not limited to the controller 206, memory 204, and position receiver 202 as subsequently described in this detailed description and the security unit 100 can include other components not expressly or impliedly described in this detailed description.

The position receiver 202 is configured to provide a position of the cargo container, which includes receiving data for calculation of a position or receiving a partially or completely calculated position. Preferably, the position is received and/or calculated by the position receiver 202 has an accuracy of about plus or minus ten kilometers (±10 km), more preferably has an accuracy of about plus or minus one kilometer (±1 km), even more preferably has an accuracy of about plus or minus one hundred meters (±100 m), an most preferably has an accuracy of about plus or minus fifteen meters (±15 m). However, the accuracy can be greater than about ten kilometers (±10 km) and less than about plus or minus fifteen meters (±15 m) as dictated by the specifications or requirements of the security application.

The position receiver 202 can have any number of configurations currently known or subsequently developed that receive data for calculation of a position or receive a previously calculated position. For example, the position receiver 202 can be a receiver for the Global Positioning System (GPS) (i.e., a GPS receiver), formally known as the Navstar GPS and operated and maintained by the United States (US) Department of Defense (DOD). The Navstar GPS is a space-based radio-navigation system having twenty-four (24) satellites and ground support that emit signals that can be used to determine position, velocity, and time at substantially any location in the world and in substantially all weather conditions in accordance with techniques that are well known to those of ordinary skill in the art. Alternatively, the position receiver 202 can be a Radio Frequency (RF) receiver that receives an RF broadcast of a position, and preferably time, of the area in which the cargo container is located and that preferably meets the desired accuracy. Furthermore, the position receiver 202 can directly receive the position signals with position and time or directly receive such signals to determine position, velocity and time or indirectly receive such position signal(s) from a communication bridge. For example, if the cargo container is stored in a hold of a ship and the position receiver 202 can not directly receive signals, a communication bridge can relay the position signal(s) into the hold.

As previously introduced in this detailed description, the security unit 100 also includes, but is not limited to, a memory 204 in addition to the position receiver 202. The memory is configured to store multiple geocentric zones (208,210,212, 214). As used herein, a geocentric zone shall be a two or more dimensional area associated with the surface of the earth. Accordingly, the geocentric zone can be specified with any number of techniques or schemes. For example, three or more points of latitude and longitude can be utilized to specify an area associated with the surface of the earth, a single latitude and longitude designation can be used with a radius to specify the area, and/or an altitude can also be used in conjunction with latitude and longitude to identify a three dimensional geocentric zones of the cargo container. The geocentric zones can be any number of unanticipated or anticipated locations or facilities in a transportation route. For example, the geocentric zones can be a packing foreign facility dock, foreign packing facility yard, route to a foreign port, foreign port entrance and storage yard, foreign port loading area, land or water route from the foreign port to a domestic port, domestic port unloading area, domestic port exist and storage yard, route to the domestic port, domestic unpacking facility.

The controller 206 of the security unit 100 is coupled to the memory 204 and the position receiver 202. The controller 214 can be formed with a single processor or multiple processors and can implemented solely with hardware, solely with software, or implemented with a combination of hardware and software as well known to those of ordinary skill in the art. Generally, the controller 214 is configured to perform a security method for the cargo container that involves the position provided by the position receiver 202 and the geocentric zones (208,210,212,214) stored in the memory 204.

Figure 3:
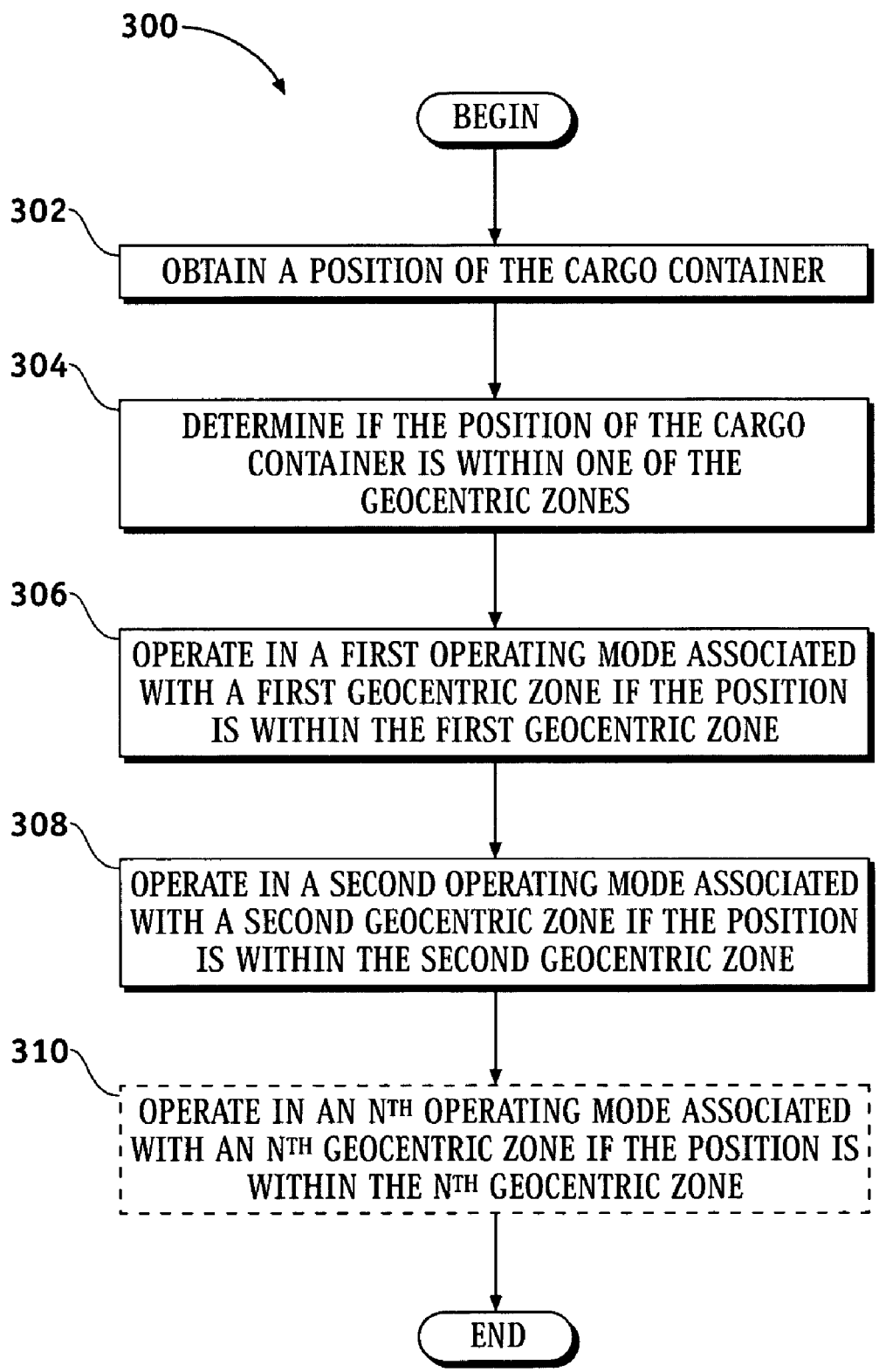
FIG. 3 is a security method for a cargo container in accordance with an exemplary embodiment of the present invention.

Referring to FIG. 3, a security method 300 for the cargo container is illustrated in accordance with an exemplary embodiment of the present invention, which is preferably performed by the controller 214 or preformed with an apparatus or combination or apparatuses other than the controller 214, position receiver 202, and memory 204 as shown in FIG. 2. The security method 300 includes, but is not limited to, the steps of obtaining the position of the cargo container 302 and determining if the cargo container is within one of multiple geocentric zones 304, which can be accomplished with any number of comparative techniques, including comparative techniques well known to those of ordinary skill in the art and subsequently developed comparative techniques. The security method 300 also includes, but is not limited to, operating in an operating mode associated with a geocentric zone based at least in part upon the determination that the cargo container is within the geocentric zone 306 and operating in another operating mode associated with another geocentric zone based at least in part upon the determination that the cargo container is within such other geocentric zone 308. The security method 300 can also include additional steps of operating in an $N^{th}$ operating mode associated with an Nth geocentric zone if the position is within the Nth geocentric zone 310, wherein N is an integer greater than two (2) (i.e., $3^{rd}$ operating mode, $3^{rd}$ geocentric zone, $4^{th}$ operating mode, $4^{th}$ geocentric zone, $5^{th}$ operating mode, $5^{th}$ geocentric zone, . . . , etc.).

The operating modes associated with the geocentric zones, which are determined by the foregoing security method 300 and/or the security unit 100 of FIG. 2, can be any number of individual operating modes. Alternatively, an operating mode can be a combination of operating modes. For example, and for illustration purposes only, the operating modes associated with geocentric zones can include a combination of communication system modes, transmission interval modes, and route mapping modes.

The communication system modes, examples of which are provided in Table 1, preferably have variations in one or more communication parameters, such as a Local Area Network (e.g., Institute of Electrical and Electronics Engineers (IEEE) 802.15.1 LAN, IEEE 802.15.4 LAN, Wireless Personal Area Network (WPAN)), Wide Area Network (WAN) (e.g., digital cellular network, analog cellular network, digital satellite network, analog satellite network, or combination or two or more of such networks). The transmission interval modes, examples of which are provided in Table 2, preferably have one or more variations in the frequency that information is transmitted from the security unit. More preferably, each of the communications received or transmitted in each of the transmission intervals and any other communications from or to the security unit are encrypted and an authentication process is successfully completed prior to a communication session. The route mapping modes, examples of which are provided in Table 3, preferably have one or more variations in the frequency of position sample in mapping the travel route of the cargo container (i.e., varies the resolution in mapping the route taken by the cargo container) as subsequently described in this detailed description.

The route mapping modes are utilized in accordance with an exemplary embodiment of the present invention as the security unit 100 and the security methods of the present invention preferably monitor the route the cargo container takes from origin to destination or a portion of such route (i.e., maps the route the cargo container takes from origin to destination or a portion of such route). Accordingly, the controller 206 is configured to receive the position from the position receiver 202 at the frequency specified by the mapping mode and store the position, preferably with a time reference for the sampling, in a memory, which can be the memory 204 configured to store the geocentric zones (208,210,212, 214) or a separate memory 222 configured to store the mapping records (224, 226, 228, 230).

In addition to the security unit 100 and the security methods of the present invention preferably mapping the cargo container route or at least a portion of the cargo container route, the security unit 100 and the security methods of the present invention preferably monitor one or more security parameters of the cargo container with one or more security sensors (232,234,236,238,240,242,244,254). For example, the controller 206 can be wirelessly or otherwise coupled to an intrusion sensor 232, light sensor 234, pressure sensor 236, toxin sensor 238, vibration sensor 240, and/or radioactivity sensor 242, and/or an intrusion sensor 244 and the security methods can include sensing one or more of these conditions. Furthermore, the controller 100 and security methods are preferably configured to receive security data from the one or more security sensors (232,234,236,238,240,242,244,254) that identify a security event and store the occurrence of a security event, preferably with a time reference and position in a memory, which can be the memory 204 configured to store the geocentric zones (208,210,212, 214), the memory 222 configured to store the mapping records (224, 226, 228, 230), and/or a separate memory 244 configured to store the security occurrences (246, 248, 250, 252) if such occurrence(s) arise.

Figure 4:
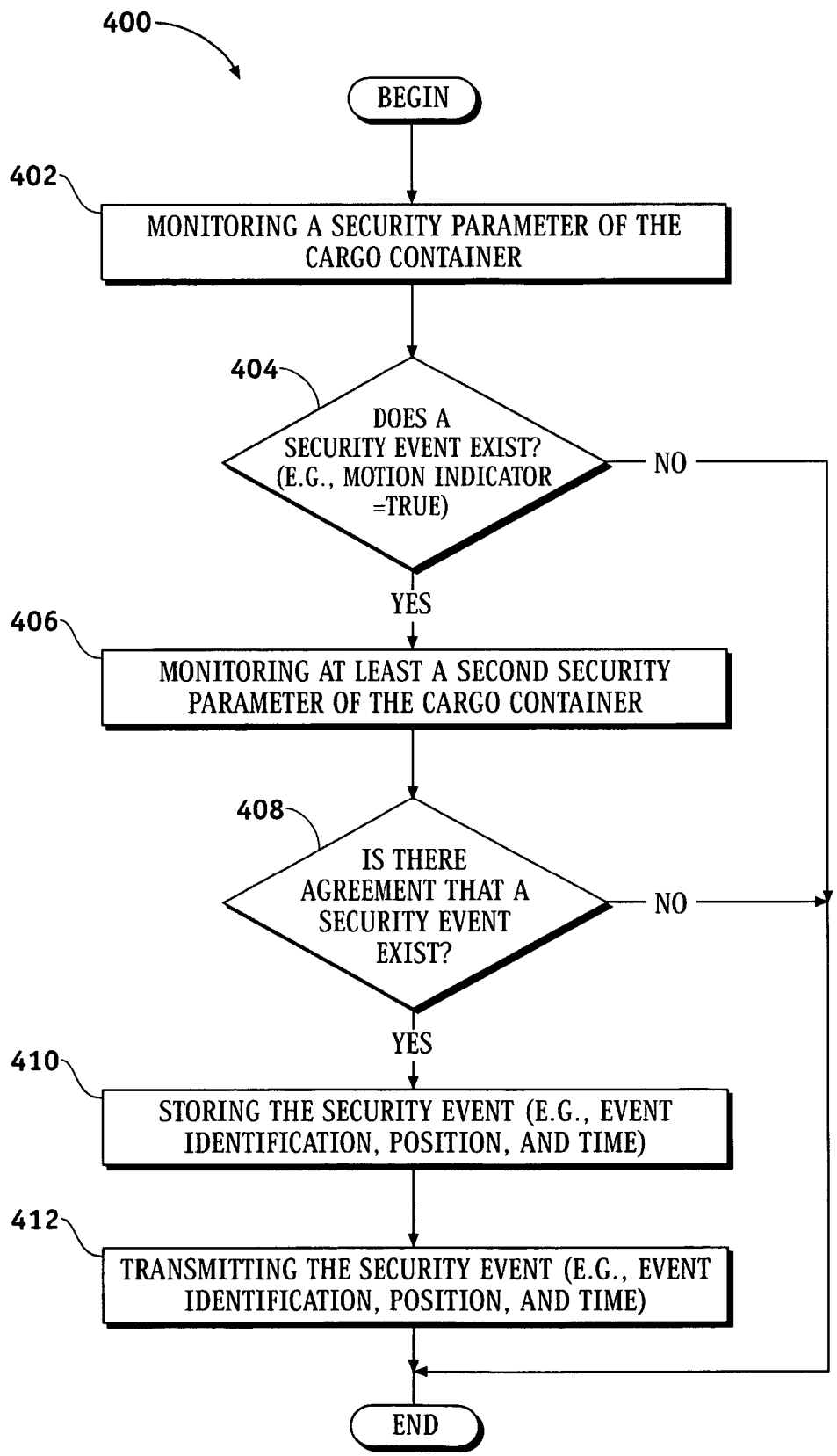
FIG. 4 is a security method for identifying a security event associated with a cargo container in accordance with an exemplary embodiment of the present invention.

Referring to FIG. 4, a security method 400 is illustrated for identifying a security event associated with a cargo container in accordance with an exemplary embodiment of the present invention, which is preferably performed by the controller 214 or preformed with an apparatus or combination or apparatuses other than the controller 214, position receiver 202, and memory 204 as shown in FIG. 2. The security method 400 includes, but is not limited to, the steps of monitoring a security parameter of the cargo container with a sensor 402 and determining if a security event exists 404. If a security event is determined to exist, the security method 400 preferably, but not necessarily, continues with monitoring one or more other security parameters of the cargo container with one or more other sensors 406 and determining if there is agreement amount more than one of the sensors that a security event does exist 408 in order to reduce false detections. Once a security event has been determined to exist, the security method continues with storing the occurrence of a security event 410, preferably with a time reference and position in a memory and transmitting such a security occurrence, preferably with the time reference and position to a security operation center 412.

As can be appreciated by the foregoing descriptions of the security unit 100 and security methods, numerous variations exist for the security unit and the security methods. These variations can arise from different geocentric zones, different operating modes or combination of operating modes, and different security criteria. Furthermore, variations can exist with selection of the operating mode based upon criteria in addition to the position of the cargo container with respect to the geocentric zones.

Figure 5:
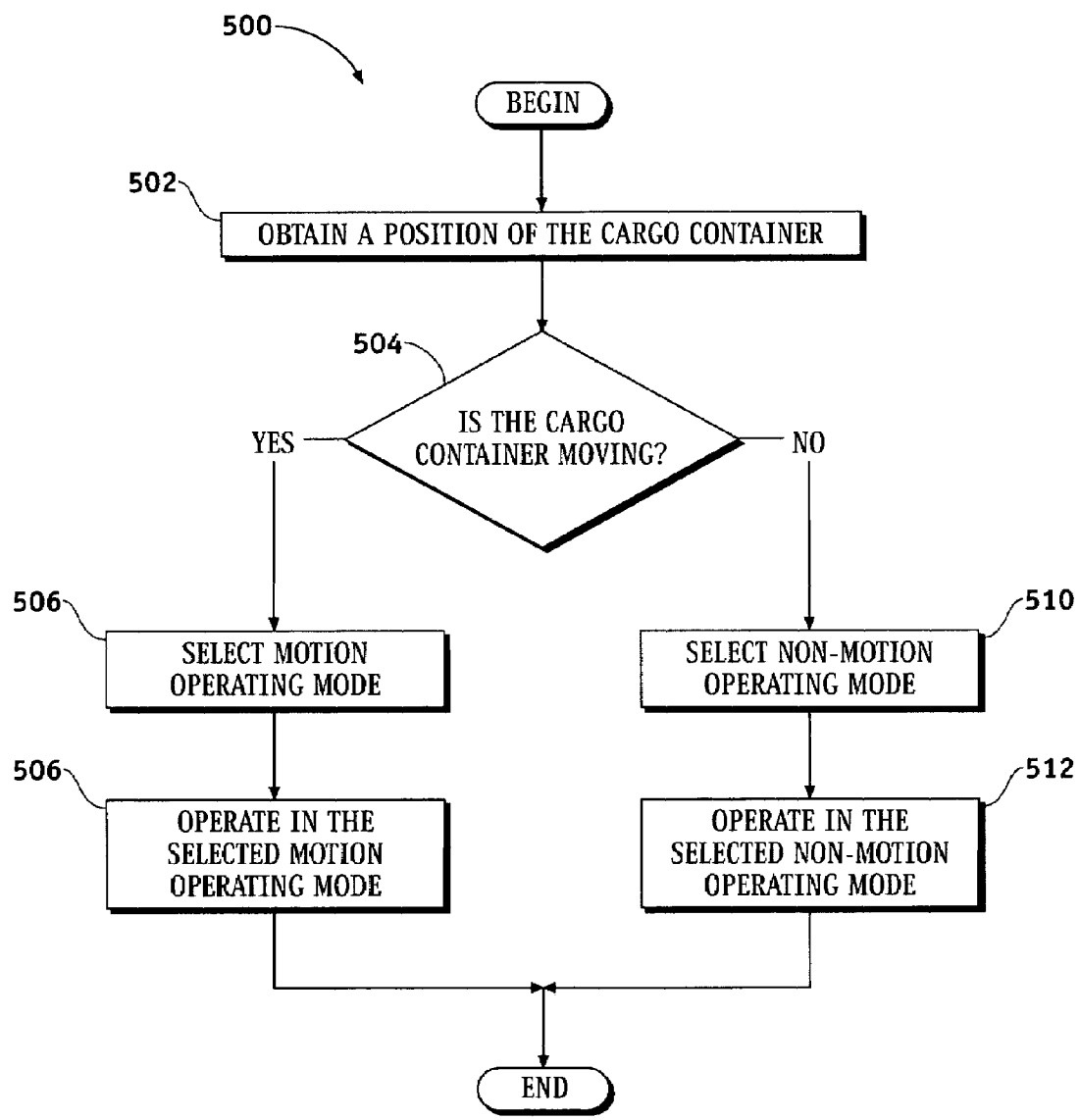
FIG. 5 is a security method for a cargo container in accordance with another exemplary embodiment of the present invention.
Figure 6:
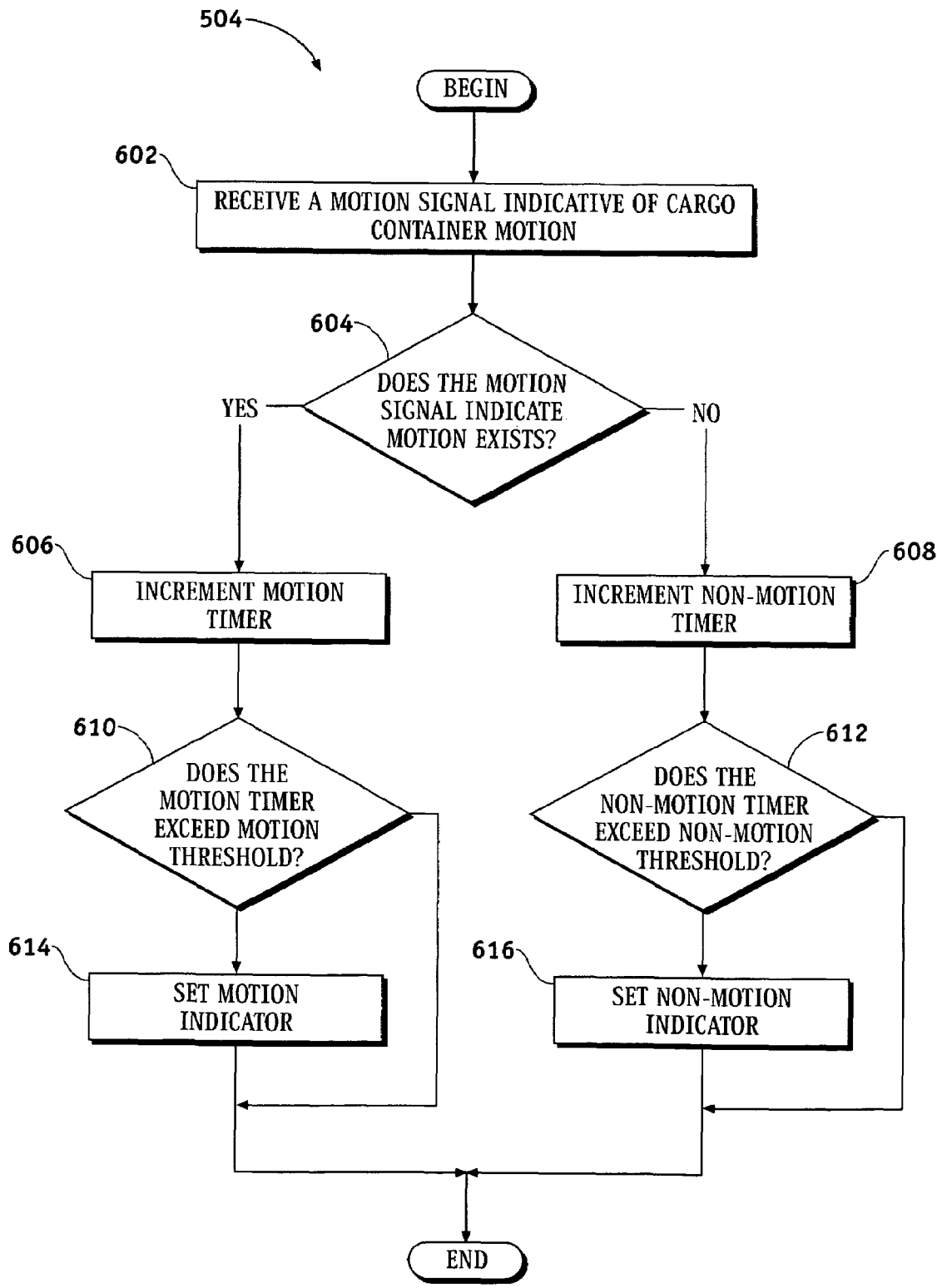
FIG. 6 is a method for determining if a cargo container is moving and validating such movement in accordance with an exemplary embodiment of the present invention.

Referring to FIG. 5, a security method 500 for the cargo container is illustrated in accordance with an exemplary embodiment of the present invention, which utilizes motion of the cargo container in addition to the position to select the operation mode. The security method 500 is preferably performed by the controller 214, position receiver 202, memory 204, motion sensor 254, and one or more of the other components of the controller 202 as previously described and shown in FIG. 2. Alternatively, the security method 500 can be performed by an apparatus or combination or apparatuses other than the controller 214, position receiver 202, memory 204, motion sensor 254, and one or more of the other components of the controller 202. The security method 500 includes, but is not limited to, the steps of obtaining a position of the cargo container 502 and determining if the cargo container is moving 504 (i.e., detection motion of the cargo container). Obtaining the position of the cargo container 502 can be accomplished using any number of techniques as described in conjunction with security unit 100 of FIG. 2 and the security method 300 of FIG. 3 and determining if the cargo container is moving 504 preferably, but not necessarily, includes validating any detected movement.

For example, and with reference to FIG. 5, determining if the cargo container is moving 504 can include, but is not limited to, receiving a motion signal indicative of cargo container motion 502, such as a motion signal generated by the motion sensor 254 as shown in FIG. 2 and well known to those of ordinary skill in the art. The motion signal is evaluated to determine if motion exists 504 and if the determination is made that the cargo container is moving, a motion timer is incremented 506 and a non-motion timer is incremented if the determination is made that the cargo container is not moving 508. The motion timer is compared to a motion threshold 510 or the non-motion timer is compared to a non-motion threshold 512. If the motion timer exceeds the motion threshold, motion has been detected for a period and a motion indicator is set. Alternatively, if the non-motion timer exceeds the non-motion threshold, motion has not been detected for a period and a non-motion indicator is set. Accordingly, this increases the likelihood that motion exists or does not exist, respectively, and reduces false sensing of motion.

Referring to FIG. 5, after determining if the cargo container is moving 504, the security method 500 selects an operating mode associated with motion and a geocentric zone 506 if motion exists and operates in the selected motion operating mode 508. Alternatively, the security method 500 selects an operating mode associated with non-motion and a geocentric zone 510 if motion does not exist and operates in the selected operating mode 512. Selection of the operating mode associated with motion and a geocentric zone 506 and operating in the selected moving operating mode 508 or selection of the operating associated with non-motion and a geocentric zone 510 and operating in the selected non-moving operating zone 512 can be accomplished using any number of techniques.

Figure 7:
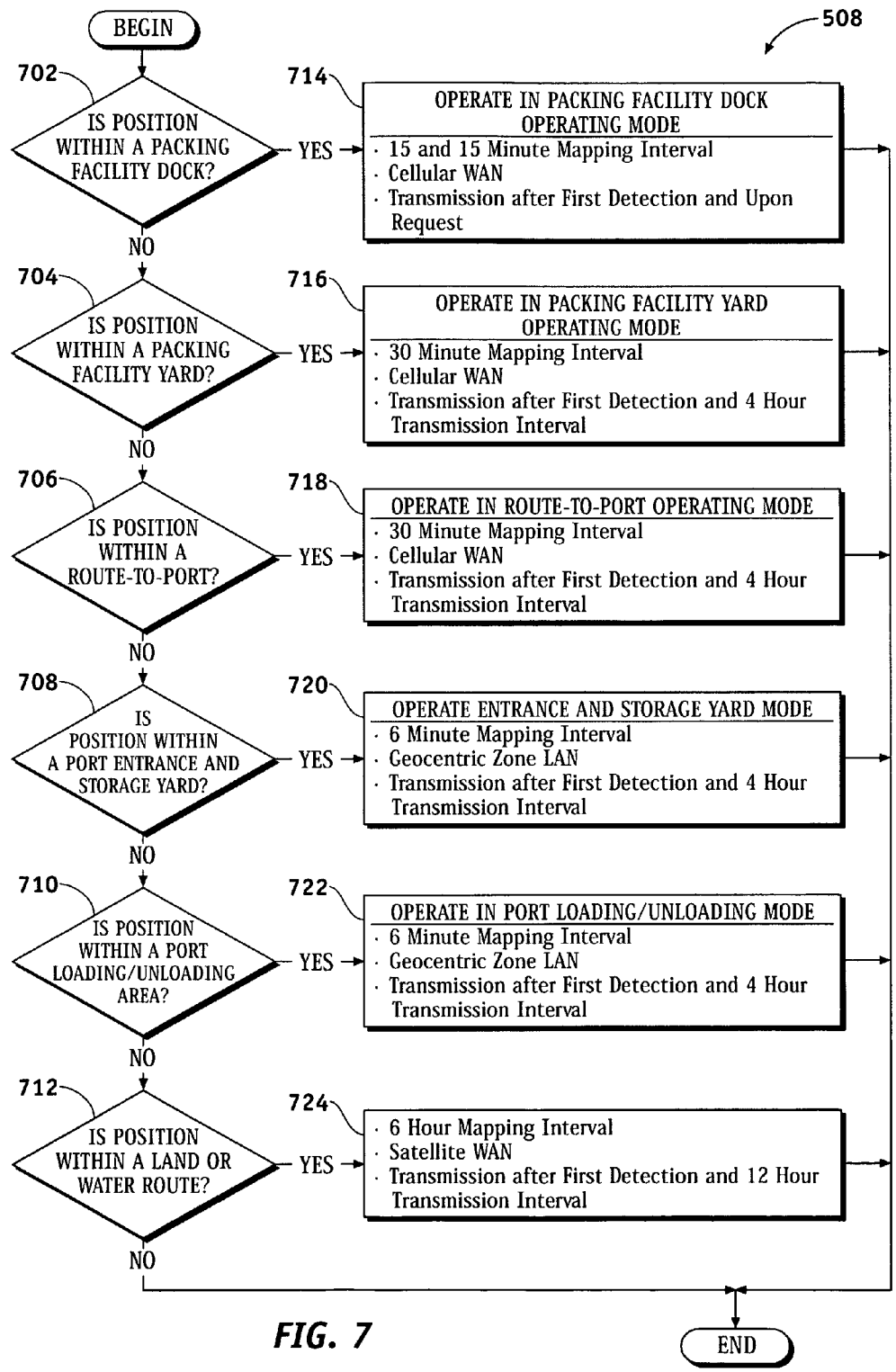
FIG. 7 is a method for selecting an operation mode of a moving cargo container in accordance with an exemplary embodiment of the present invention.

For example, referring to FIG. 7, a method of selecting an operating mode associated with motion and a geocentric zone 508 is illustrated in accordance with an exemplary embodiment of the present invention. The method 508 includes, but is not limited to, multiple steps (702,704,706,708,710,712) to determine if the position of the cargo container is within a geocentric zone, which can be accomplished using any number of comparative techniques, including comparative techniques well known to those of ordinary skill in the art and subsequently developed comparative techniques. In addition, the method 508 includes, but is not limited to, operating in a specific operating mode if the determination is made that the cargo container is within a geocentric zone associated with the operating mode (714,716,718,720,722, 724). The moving operating modes shown in FIG. 7 as examples comprise operating modes described in Table 1, Table 2 and/or Table 3. However, other operating modes can be utilized in accordance with the present invention.

Figure 8:
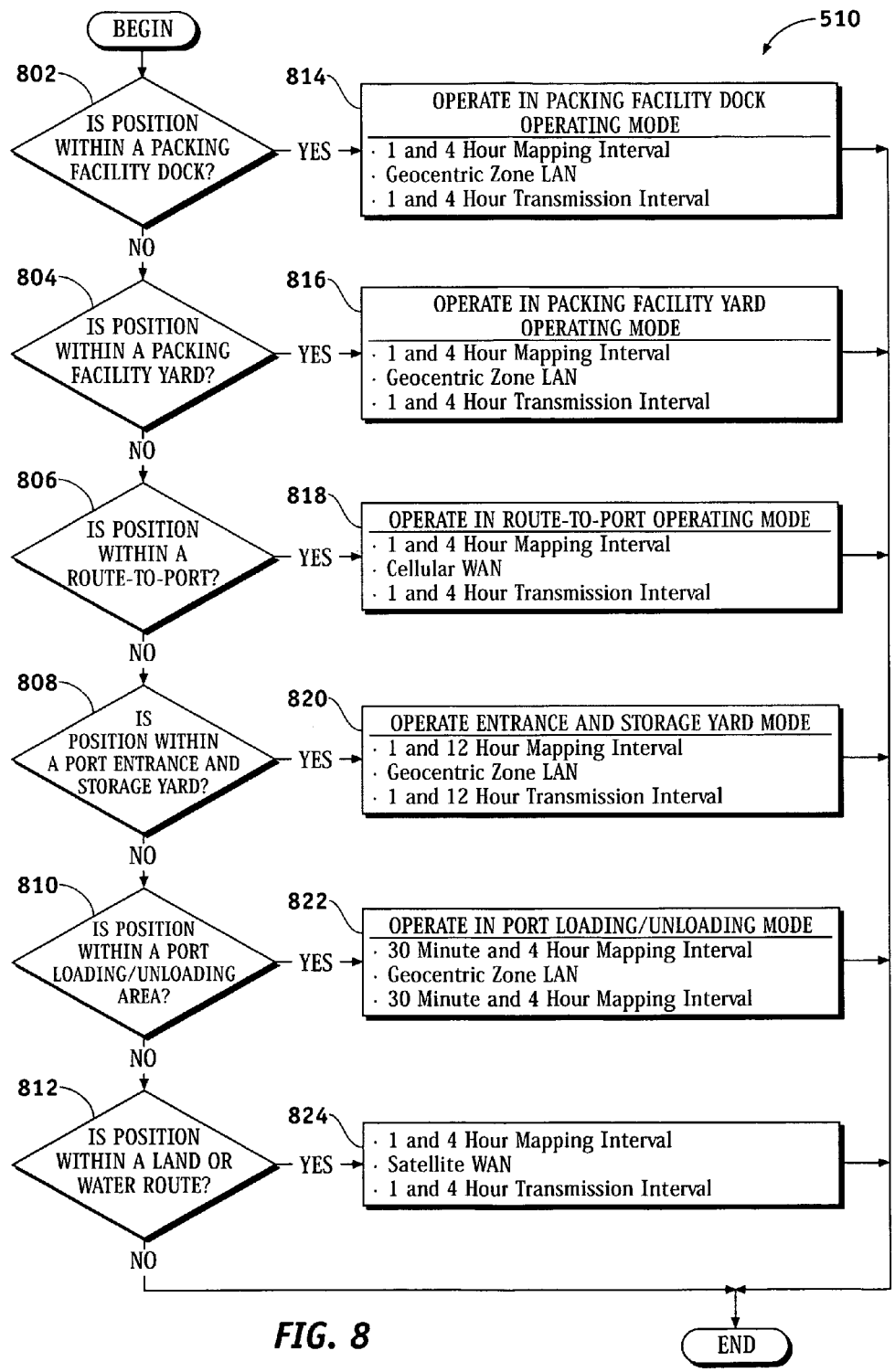
FIG. 8 is a method for selecting an operation mode of a non-moving cargo container in accordance with an exemplary embodiment of the present invention.

Referring to FIG. 8, an example of the method of selecting an operating mode associated with non-motion and a geocentric zone 510, which is similar to the method of selecting the operating mode associated with motion and the geocentric zone 510 previously described with reference to FIG. 7; is illustrated in accordance with an exemplary embodiment of the present invention. The method 510 includes, but is not limited to, multiple steps (802,804,806,808,810,812) to determine if the position of the cargo container is within a geocentric zone, which can be accomplished using any number of comparative techniques, including comparative techniques well known to those of ordinary skill in the art and subsequently developed comparative techniques. In addition, the method 510 includes, but is not limited to, operating in a specific operating mode if the determination is made that the cargo container is within a geocentric zone associated with the operating mode multiple steps (814,816,818,820,822,824). The non-moving operating modes shown in FIG. 8 as examples comprise operating modes described in Table 1, Table 2 and/or Table 3. However, other operating modes can be utilized in accordance with the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

TABLE 1

COMMUNICATION SYSTEM MODES

| Mode Identification | Mode Description |
|---|---|
| SATELLITE WAN | Transmit and/or receive using a WAN formed at least partially with a satellite network |
| CELLULAR WAN | Transmit and/or receive position upon first detecting new geocentric zone was entered and send health and status of security unit upon request using a WAN formed at least partially with a cellular network. |
| GEOCENTRIC ZONE LAN | Transmit and/or receive using a LAN of the geocentric zone with a frequency specified for the geocentric zone |

TABLE 2

TRANSMISSION INTERVALS

| Mode Identification | Mode Description |
|---|---|
| 1 AND 4 HOUR TRANSMISSION INTERVAL | Transmit position, health and security status after one (1) hour and at four (4) hour intervals thereafter |
| TRANSMISSION AFTER FIRST DETECTION AND UPON REQUEST | Transmit position after first detecting a geocentric zone has been entered and transmit health and security status upon receiving a request |
| TRANSMISSION AFTER FIRST DETECTION AND 4 HOUR TRANSMISSION INTERVAL | Transmit position after first detecting a geocentric zone has been entered and transmit health and security status at four (4) hour intervals thereafter |
| 1 AND 12 HOUR TRANSMISSION INTERVAL | Transmit position, health and security status after one (1) hour and at twelve (12) hour intervals thereafter |
| 30 MINUTE AND 4 HOUR TRANSMISSION INTERVAL | Transmit position, health and security status after thirty (30) minute and at four (4) hour intervals thereafter |
| TRANSMISSION AFTER FIRST DETECTION AND 12 HOUR TRANSMISSION INTERVAL | Transmit position after first detecting a geocentric zone has been entered and transmit health and security status upon first detection and at twelve (12) hour intervals thereafter |

TABLE 3

ROUTE MAPPING MODES

| Mode Identification | Mode Description |
|---|---|
| 30 Second Mapping Interval | Determine position, time reference, and store at thirty (30) second intervals |
| 6 Minute Mapping Interval | Determine position, time reference, and store at six (6) minute intervals |
| 15 and 15 Minute Mapping Interval | Determine position, time reference, and store at fifteen (15) minute intervals |
| 30 Minute and 4 Hour Mapping Interval | Determine position, time reference, and store after thirty (30) minutes and at four (4) hour intervals thereafter |
| 1 and 4 Hour Mapping Interval | Determine position, time reference, and store after one (1) hour and at four (4) hour intervals thereafter |
| 30 Minute Mapping Interval | Determine position, time reference, and store at thirty (30) minute intervals |
| 30 Minute and 4 Hour Mapping Interval | Determine position, time reference, and store after thirty (30) minutes and at four (4) hour intervals thereafter |
| 1 and 12 Hour Mapping Interval | Determine position, time reference, and store after one hour and at twelve hour intervals thereafter |
| 6 Hour Mapping Interval | Determine position, time reference, and store at six (6) hour intervals |

What is claimed is:

1. A security unit for a cargo container, comprising:
a positioning receiver configured to provide a position of the cargo container;
a memory configured to store a first geocentric zone and a second geocentric zone; and
a controller coupled to said positioning receiver and said memory, said controller configured to:
receive said position of the cargo container from said positioning receiver;
determine if said position of the cargo container is within one of said first geocentric zone and said second geocentric zone stored in said memory;
operate in a first operating mode associated with said first geocentric zone if said position is within said first geocentric zone; and
operate in a second operating mode associated with said second geocentric zone if said position is within said second geocentric zone.

2. The security unit for the cargo container of claim 1, wherein said memory is further configured to store a third geocentric zone and said controller is further configured to determine if said position of the cargo container is within said third geocentric zone and operate in a third operating mode associated with said third geocentric zone if said position is within said third geocentric zone.

3. The security unit for the cargo container of claim 2, wherein said memory is further configured to store a fourth geocentric zone and said controller is further configured to determine if said position of the cargo container is within said fourth geocentric zone and operate in a fourth operating mode associated with said fourth geocentric zone if said position is within said fourth geocentric zone.

4. The security unit for the cargo container of claim 1, wherein said cargo container is a passenger compartment.

5. The security unit for the cargo container of claim 1, wherein said position has an accuracy of about plus or minus ten kilometers (±10 km).

6. The security unit for the cargo container of claim 1, wherein said position has an accuracy of about plus or minus 15 meters (±15 m).

7. The security unit for the cargo container of claim 1, wherein said position receiver is a Global Positioning System (GPS) receiver.

8. The security unit for the cargo container of claim 1, wherein said position is a Radio Frequency (RF) receiver that is configured to receive a RF broadcast of at least said position.

9. The security unit for the cargo container of claim 1, wherein said first geocentric zone and said second geocentric zone are specified with at least a first latitude and a first longitude.

10. The security unit for the cargo container of claim 9, wherein said first geocentric zone is further specified with at least a first radius.

11. The security unit for the cargo container of claim 1, wherein said geocentric zone is a port of lading.

12. The security unit for the cargo container of claim 1, wherein said first operating mode comprises a first communication system mode and said second operating mode comprises a second communication system mode.

13. The security unit for the cargo container of claim 1, wherein said first operating mode comprises a first transmission interval mode and said second operating mode comprises a second transmission interval mode.

14. The security for the cargo container of claim 1, wherein said first operating mode comprises a first route mapping mode and said second operating mode comprises a second route mapping mode.

15. The security unit for the cargo container of claim 1, further comprising a first security sensor configured to generate first security data associated with the cargo container and wherein said controller is configured to receive said first security data and identify a security event based at least in part on said first security data.

16. The security unit for the cargo container of claim 15, further comprising a second security sensor configured to generate second security data associated with the cargo container and said controller is configured to receive said second security data and identify said security event based at least in part upon said first security data and said second security data.

17. The security unit for the cargo container of claim 15, wherein said security event is stored in said memory.

18. The security unit for the cargo container of claim 1, wherein said security even is transmitted to a security operation center.

19. The security unit for the cargo container of claim 1, further comprising a sensor configured to generate a data associated with a condition of the cargo container and said controller is configured to receive said condition and operate in said first operating mode if said position is within said first geocentric zone and if said condition is met.

20. The security unit for the cargo container of claim 1, wherein said condition is motion of the cargo container.

21. A security method for a cargo container, comprising the steps of:
　receiving a position of the cargo container;
　determining if said position of the cargo container is within a first geocentric zone;
　determining if said position of the cargo container is within a second geocentric zone;
　operating in a first operating mode associated with said first geocentric zone if said position is within said first geocentric zone; and
　operating in a second operating mode associated with said second geocentric zone if said position is within said second geocentric zone.

22. The security method for the cargo container of claim 21, further comprising the steps of:
　determining if said position of the cargo container is within a third geocentric zone; and
　operating in a third operating mode associated with said third geocentric zone if said position is within said third geocentric zone.

23. The security method for the cargo container of claim 22, further comprising the steps of:
　determining if said position of the cargo container is within said fourth geocentric zone; and
　operating in a fourth operating mode associated with said fourth geocentric zone if said position is within said fourth geocentric zone.

24. The security method unit for the cargo container of claim 21, wherein said cargo container is a passenger compartment.

25. The security method for the cargo container of claim 21, wherein said position has an accuracy of about plus or minus ten kilometers (±10 km).

26. The security method for the cargo container of claim 21, wherein said position has an accuracy of about plus or minus fifteen meters (±15 m).

27. The security method for the cargo container of claim 21, wherein said first geocentric zone and said second geocentric zone are specified with at least a first latitude and a first longitude.

28. The security method for the cargo container of claim 27, wherein said first geocentric zone is further specified with at least a first radius.

29. The security method for the cargo container of claim 21, wherein said geocentric zone is a port of lading.

30. The security method for the cargo container of claim 21, wherein said first operating mode comprises a first communication system mode and said second operating mode comprises a second communication system mode.

31. The security method for the cargo container of claim 21, wherein said first operating mode comprises a first transmission interval mode and said second operating mode comprises a second transmission interval mode.

32. The security method for the cargo container of claim 21, wherein said first operating mode comprises a first route mapping mode and said second operating mode comprises a second route mapping mode.

33. The security method for the cargo container of claim 21, further comprising the steps of:
　generating first security data associated with the cargo container; and
　identifying a security event based at least in part on said first security data.

34. The security method for the cargo container of claim 33, further comprising the steps of:
　generating second security data associated with the cargo container; and
　identifying said security event based at least in part upon said first security data and said second security data.

35. The security method for the cargo container of claim 33, further comprising the step of storing said security event.

36. The security method for the cargo container of claim 33, further comprising the step of transmitting said security event to a security operation center.

37. The security method for the cargo container of claim 21, further comprising the steps of:
　generating data associated with a condition of the cargo container; and operating in said first operating mode if said position is within said first geocentric zone and if said condition is met.

38. The security method for the cargo container of claim 37, wherein said condition is motion of the cargo container.

* * * * *